(12) United States Patent
Baert et al.

(10) Patent No.: US 11,718,565 B2
(45) Date of Patent: *Aug. 8, 2023

(54) PANEL FOR FORMING A FLOOR COVERING AND SUCH FLOOR COVERING

(71) Applicant: Champion Link International Corporation, The Valley (AI)

(72) Inventors: Thomas Luc Martine Baert, Sint-Martens-Latem (BE); Tom Van Poyer, Jiaxing Zhejiang (CN); Sven Boon, Jiaxing Zhejiang (CN)

(73) Assignee: Champion Link International Corporation

( * ) Notice: Subject to any disclaimer, the term of this patent is extended or adjusted under 35 U.S.C. 154(b) by 68 days.

This patent is subject to a terminal disclaimer.

(21) Appl. No.: 17/339,168

(22) Filed: Jun. 4, 2021

(65) Prior Publication Data

US 2021/0292237 A1   Sep. 23, 2021

Related U.S. Application Data

(63) Continuation-in-part of application No. 16/778,570, filed on Jan. 31, 2020, now Pat. No. 11,053,696.

(51) Int. Cl.
*E04F 15/00* (2006.01)
*C04B 28/10* (2006.01)
(Continued)

(52) U.S. Cl.
CPC ............ *C04B 28/105* (2013.01); *C04B 24/06* (2013.01); *C04B 28/30* (2013.01);
(Continued)

(58) Field of Classification Search
CPC ........ E04F 2201/0552; E04F 2201/023; E04F 2201/0535; E04F 2201/0146;
(Continued)

(56) References Cited

U.S. PATENT DOCUMENTS 2,944,291 A   10/1957   Prior et al.
3,421,597 A   1/1969   Blau Hans
(Continued)

FOREIGN PATENT DOCUMENTS

CA   2523866   11/2004
CN   100419019   ‡ 2/2007
(Continued)

OTHER PUBLICATIONS

International Search Report and Written Opinion for corresponding PCT App. No. NL2024805 dated Sep. 23, 2020.‡
(Continued)

*Primary Examiner* — Chi Q Nguyen
(74) *Attorney, Agent, or Firm* — Emerson, Thomson & Bennett, LLC; Roger D. Emerson; Peter R. Detorre

(57) ABSTRACT

The invention relates to a panel, in particular a floor panel, suitable for forming a floor covering, wherein the panel has a substantially planar top side, and a substantially planar bottom side, at least four substantially linear side edges comprising at least one pair of opposite side edges, preferably provided with locking means.

19 Claims, 3 Drawing Sheets

(51) Int. Cl.
*C04B 28/30* (2006.01)
*E04F 15/02* (2006.01)
*E04F 15/08* (2006.01)
*E04F 15/10* (2006.01)
*C04B 24/06* (2006.01)
*C04B 111/60* (2006.01)
*C04B 111/00* (2006.01)

(52) U.S. Cl.
CPC ........ *E04F 15/02038* (2013.01); *E04F 15/08* (2013.01); *E04F 15/107* (2013.01); *C04B 2111/0025* (2013.01); *C04B 2111/60* (2013.01)

(58) Field of Classification Search
CPC ........ E04F 2201/043; E04F 2201/0547; E04F 2201/0153; E04F 2201/0138; E04F 2201/042; E04F 15/02038; E04F 15/08; E04F 15/102; E04F 15/105; E04F 15/107; B32B 29/007; B32B 2260/046; B32B 2262/106; B32B 2266/0228; B32B 2266/0235; B32B 2266/025; B32B 2266/0278; B32B 2266/08; B32B 2305/022; B32B 2307/54; B32B 2307/72; B32B 2307/732; B32B 2307/734; B32B 2471/00; C04B 28/105; C04B 24/06; C04B 28/30; C04B 2111/0025; C04B 2111/60
USPC .. 52/592.1, 592.3, 592.2, 578, 588.1, 309.1, 52/309.3
See application file for complete search history.

(56) References Cited

U.S. PATENT DOCUMENTS

| | | | |
|---|---|---|---|
| 3,931,428 A | 1/1976 | Reick | |
| 4,278,728 A | 7/1981 | Honda | |
| 5,336,551 A | 8/1994 | Graiver | |
| 5,631,053 A | 5/1997 | Andersen | |
| 5,693,395 A | 12/1997 | Wine | |
| 5,776,580 A | 7/1998 | Rasmussen | |
| 6,688,061 B2 ‡ | 2/2004 | Garcia | B32B 23/04 52/311.1 |
| 6,761,794 B2 | 7/2004 | Mott | |
| 6,933,043 B1 | 8/2005 | Son | |
| 7,255,907 B2 ‡ | 8/2007 | Feigin | B32B 13/14 428/70 |
| 7,399,510 B2 | 7/2008 | Dupouy | |
| 7,866,103 B2 | 1/2011 | Marschke | |
| 7,918,062 B2 ‡ | 4/2011 | Chen | B41J 2/005 52/311.1 |
| 8,287,991 B2 | 10/2012 | Donelson | |
| 8,419,877 B2 | 4/2013 | Pervan | |
| 10,328,680 B2 | 6/2019 | Pervan | |
| 10,828,881 B2 | 11/2020 | Bergelin | |
| 10,918,714 B2* | 2/2021 | Wong | A61P 11/00 |
| 11,053,696 B1* | 7/2021 | Baert | E04B 1/99 |
| 11,097,512 B1* | 8/2021 | Baert | B32B 13/10 |
| 11,391,049 B2* | 7/2022 | Baert | B32B 13/04 |
| 2003/0233809 A1 | 12/2003 | Pervan | |
| 2005/0208258 A1 | 9/2005 | Hosokawa | |
| 2005/0286397 A1 | 12/2005 | Inagaki | |
| 2006/0115442 A1 | 6/2006 | Katz | |
| 2007/0033891 A1 | 2/2007 | Imbabi | |
| 2008/0149137 A1 | 6/2008 | Steinbrenner | |
| 2008/0318004 A1 | 12/2008 | Ruhe | |
| 2009/0011279 A1 | 1/2009 | Wisenbaker, Jr. et al. | |
| 2009/0017320 A1 | 1/2009 | Donelson | |
| 2009/0155612 A1 | 6/2009 | Pervan | |
| 2009/0235607 A1 | 9/2009 | Chen | |
| 2009/0308001 A1 | 12/2009 | Wu | |
| 2009/0313931 A1* | 12/2009 | Porter | B32B 13/10 52/309.3 |
| 2010/0115974 A1 | 5/2010 | Okaza | |
| 2011/0067336 A1 | 3/2011 | McDonald | |
| 2011/0268916 A1* | 11/2011 | Pardue, Jr. | B32B 3/12 428/688 |
| 2013/0295346 A1 | 11/2013 | Ferguson | |
| 2014/0087156 A1 | 3/2014 | Sarkis | |
| 2014/0134402 A1 ‡ | 5/2014 | Pallon | B32B 9/042 428/157 |
| 2014/0227509 A1* | 8/2014 | Gillman | B32B 9/046 428/319.1 |
| 2014/0272302 A1 | 9/2014 | Ciuperca | |
| 2015/0059621 A1 ‡ | 3/2015 | Hauber | C04B 12/027 106/690 |
| 2015/0121793 A1 | 5/2015 | Segeart | |
| 2016/0214395 A1 | 7/2016 | Torfs | |
| 2016/0288447 A1 | 10/2016 | Cordeiro | |
| 2016/0369507 A1 | 12/2016 | Pervan | |
| 2017/0204616 A1 ‡ | 7/2017 | Scholz | E04F 15/107 |
| 2017/0217133 A1 | 8/2017 | Jordan et al. | |
| 2018/0147873 A1 | 5/2018 | De Mondt | |
| 2018/0258651 A1 | 9/2018 | Meersseman | |
| 2018/0283014 A1 | 10/2018 | Hodgkins et al. | |
| 2019/0292793 A1 | 9/2019 | Van Vlassenrode | |
| 2019/0308914 A1 ‡ | 10/2019 | Kong | C04B 41/009 |
| 2019/0383031 A1 | 12/2019 | Baert | |
| 2020/0039190 A1 | 2/2020 | Lenaerts | |
| 2020/0080321 A1 | 3/2020 | Baert | |
| 2020/0123788 A1 | 4/2020 | Baert | |
| 2020/0131784 A1 | 4/2020 | Boucke | |
| 2020/0207118 A1 | 7/2020 | Lenaerts | |
| 2020/0218415 A1 | 7/2020 | Jang | |
| 2020/0263440 A1* | 8/2020 | Chen | B32B 27/304 |
| 2020/0308846 A1 | 10/2020 | Josefsson | |
| 2020/0325689 A1* | 10/2020 | Li | B41M 5/0011 |
| 2020/0370308 A1* | 11/2020 | Strickland | B32B 23/20 |
| 2021/0180322 A1* | 6/2021 | Busche | B32B 5/022 |

FOREIGN PATENT DOCUMENTS

| | | | |
|---|---|---|---|
| CN | 101386516 | 3/2009 | |
| CN | 101386516 A ‡ | 3/2009 | ........... C04B 28/342 |
| DE | 102012000468 | 7/2013 | |
| DE | 102012000468 A1 ‡ | 7/2013 | ........... B32B 13/00 |
| EP | 2060389 ‡ | 5/2009 | |
| EP | 2690142 | 1/2014 | |
| EP | 3536874 | 9/2019 | |
| GB | 2509821 | 7/2014 | |
| JP | H0828015 | 1/1996 | |
| KR | 20140066086 | 5/2014 | |
| SE | 19503648 | 3/2019 | |
| WO | 2007111552 | 10/2007 | |
| WO | 2012004701 | 1/2012 | |
| WO | 2014011110 | 1/2012 | |
| WO | 2012061300 | 5/2012 | |
| WO | WO-2012061300 ‡ | 5/2012 | |
| WO | WO-2012061300 A2 ‡ | 5/2012 | ........ E04F 15/02038 |
| WO | 2014007738 | 1/2014 | |
| WO | 2018234561 | 12/2018 | |
| WO | 2019064113 | 4/2019 | |
| WO | 2020009973 | 1/2020 | |
| WO | 2020114645 | 6/2020 | |
| WO | WO-2020114645 A1 ‡ | 6/2020 | ........... E04F 15/102 |
| WO | 2020197475 | 10/2020 | |

OTHER PUBLICATIONS

International Search Report and Written Opinion of corresponding Application No. NL 2025119 dated Jan. 14, 2021.
International Search Report and Written Opinion of corresponding PCT Application No. NL2025684, dated Mar. 3, 2021.
International Search Report and Written Opinion for corresponding App. No. NL 2024807 dated Sep. 18, 2020.
International Search Report and Written Opinion for corresponding App. No. NL 2024806 dated Nov. 26, 2020.
International Search Report and Written Opinion for corresponding PCT App. No. NL 2026068 dated Feb. 4, 2021.

(56) References Cited

OTHER PUBLICATIONS

International Search Report and Written Opinion for corresponding PCT App. No. NL 2025620 dated Feb. 8, 2021.
International Search Report and Written Opinion for corresponding PCT App. No. NL 2026069 dated Feb. 5, 2021.

\* cited by examiner
‡ imported from a related application

PANEL FOR FORMING A FLOOR COVERING AND SUCH FLOOR COVERING

TECHNICAL FIELD

The invention relates to a panel, in particular a floor panel or a wall panel, suitable for forming a decorative floor or wall covering. The invention furthermore relates to such floor covering.

BACKGROUND

The flooring industry commonly uses mostly traditional materials for manufacturing (laminated) floor tiles. Examples of these materials are: high density fiberboard (HDF), which can be merged together by a formaldehyde or phenol-based resin; heterogeneous or homogeneous polyvinyl chloride (PVC), which may possibly comprise any plasticizers, pieces of solid hardwood; layers of veneers glued together; and fired and glazed clay such as ceramic and porcelain tiles. The purpose of use of these materials depends mainly on their material properties such as impact resistance, rigidity, acoustic performance and/or appearance. However, an interest in the use of alternative materials has occurred over the last few years. An example thereof is the use of mineral materials, since mineral materials generally benefit a relatively high and dimensional stability and sufficient resistance to heat, and have a low impact on the environment compared to traditional materials such as PVC or HDF. However, due to its development being focused on its use as a building material, in particular as a gypsum/drywall replacement, it is not as of yet particularly suitable for use as component of a floor panel. Among other characteristics, an improvement in the bending strength, impact resistance, indentation resistance, internal cohesion and surface adhesion of a panel made of such a mineral material is desirable to make it suitable for use as a component of a floor panel.

It is a goal of the invention to provide at least an alternative embodiment of a composite mineral panel, in particular a floor panel, having competitive material properties with respect to the state of the art.

BRIEF DESCRIPTION OF THE DRAWINGS

The invention will be elucidated on the basis of non-limitative exemplary embodiments shown in the following figures. Herein shows.

Within these figures, similar reference numbers correspond to similar or equivalent elements or features.

DETAILED DESCRIPTION

Figure 1:
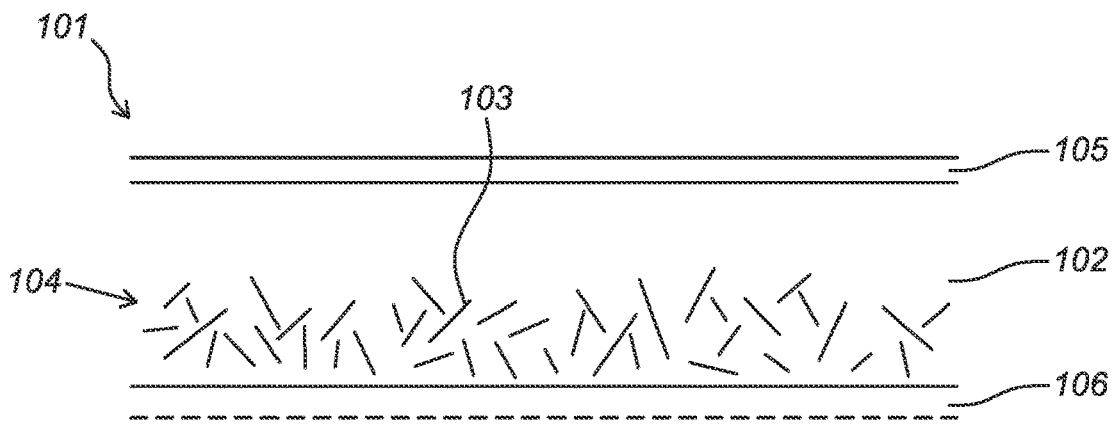
FIG. 1 a first possible embodiment of panel according to the present invention, FIG. 2 a second possible embodiment of a panel according to the present invention, FIG. 3 a third possible embodiment of a panel according to the present invention.

The invention provides thereto a panel, in particular a floor or wall panel, suitable for forming a floor or wall covering, comprising at least one core layer having a planar top side, and a planar bottom side, at least four linear side edges, wherein at least one core layer comprises a magnesium oxide composition comprising at least a magnesium oxide and a magnesium salt, wherein said magnesium oxide composition comprises a magnesium crystal structure. The magnesium crystal structure preferably comprises at least 50% by weight of at least one whisker-phase magnesium crystal structure.

The invention also relates to a panel, in particular a floor panel, suitable for forming a floor covering, wherein the panel has a substantially planar top side, and a substantially planar bottom side, at least four substantially linear side edges comprising at least one pair of opposite side edges, the panel comprising at least one core layer at least partially comprising a magnesium crystal structure wherein said at least one core layer comprises at least one compound comprising at least two hydroxyl groups, preferably wherein said compound is present in the range of 0.05% to 5% by weight.

The core layer at least partially comprising a magnesium crystal structure which comprises at least one compound comprising at least two hydroxyl groups, preferably wherein said compound is present in the range of 0.05% to 5% by weight, results in the crystal structure having an advantageous amount of crystal in an advantageous whisker or needle form, preferably more than 50% by weight of the magnesium crystal structure.

The invention thus also relates to a panel, in particular a floor panel, suitable for forming a floor covering, wherein the panel has a substantially planar top side, and a substantially planar bottom side, at least four substantially linear side edges comprising at least one pair of opposite side edges, the panel comprising at least one core layer at least partially comprising a magnesium crystal structure wherein said at least one core layer comprises at least one magnesium crystal structure comprising in more than 50% by weight at least one whisker crystal phase.

The core layer according to the present invention has greatly improved characteristics compared to conventional magnesium oxide based core layers due to the presence of an increased amount of crystal in an advantageous whisker-phase magnesium crystal structure. Hence, such core layer comprises more whisker or needle form magnesium crystals than magnesium crystals present in a flaky or irregular form. The panel according to invention having a magnesium crystal structure which comprises at least 50% by weight of at least one whisker-phase magnesium crystal structure benefits of a notable improvement in internal cohesion, a good impact resistance and good bending strength to the panel. This results in the panel according to the present invention being particularly suitable for decorative residential and commercial flooring purposes.

The magnesium oxide composition could also comprise magnesium oxide, at least one magnesium salt and water. When it is referred to a magnesium crystal structure also a magnesium oxide crystal structure can be meant.

The invention also relates to a panel, in particular a floor or wall panel, suitable for forming a floor or wall covering, comprising at least one core layer having a planar top side, and a planar bottom side, at least four linear side edges, wherein said at least one core layer comprises a magnesium crystal structure which comprises at least 50% by weight of at least one whisker-phase magnesium crystal structure. The magnesium crystal structure can be formed by a magnesium oxide composition comprising at least magnesium oxide and magnesium salt. The invention also relates to a panel, in particular a floor panel, suitable for forming a floor covering, wherein the panel has a substantially planar top side, a substantially planar bottom side, at least four substantially linear side edges comprising at least one pair of opposite side edges, and at least one core layer which at least partially comprises a magnesium crystal structure comprising magnesium oxide and at least one magnesium oxide compound chosen from the groups of magnesium (oxy)sulfate and magnesium (oxy)chloride. The at least one core layer preferably comprises at least one compound comprising at least two hydroxyl groups. Preferably, said compound is present in the range of 0.05% to 5% by weight of the at least one core layer. The core layer at least partially comprising a magnesium crystal structure which preferably comprises at least one compound comprising at least two hydroxyl groups, preferably wherein said compound is present in the range of 0.05% to 5% by weight, results in the crystal structure having an increased amount of crystals in an advantageous whisker or needle form than in a flaky or irregular form.

The invention also relates to a panel, in particular a floor panel, suitable for forming a floor covering, wherein the panel has a substantially planar top side, and a substantially planar bottom side, at least four substantially linear side edges comprising at least one pair of opposite side edges, the panel comprising a core layer comprising a magnesium oxide cement, wherein the magnesium oxide cement comprises magnesium oxide crystals in a flaky or irregular form and in a whisker or needle form, wherein there are more crystals in the whisker or needle form than in the flaky or irregular form. The at least one core layer comprises a magnesium crystal structure, for example magnesium oxysulfate or oxychloride crystal structure, which at least partially, and preferably substantially entirely form a dense crystal microstructure in a whisker or needle form, thereby providing a notable improvement in internal cohesion, a good impact resistance and good bending strength to the panel. This results in the panel being particularly suitable for decorative residential and commercial flooring purposes. The magnesium crystal structure comprises, preferably, magnesium oxysulfate or magnesium oxychloride crystals having a magnesium oxysulfate whisker or needle form and magnesium chloride crystals having a magnesium chloride whisker or needle form. In particular, the core layer comprises a magnesium oxide composition or a magnesium oxide cement.

The magnesium salt is preferably magnesium sulfate and/or magnesium chloride. The formation and microstructure of a magnesium oxide composition or cement can be described in "crystal" or "hydration" phases and expressed in terms of a ternary system consisting of the ratio of magnesia, a magnesium salt such as magnesium sulfate or magnesium chloride, and water. Crystalline phases are formed upon curing into a ceramic compound and can be expressed in an abbreviated version referring to the molar ratio of each compound in the crystal formed. Magnesium oxysulfate cement, which uses the salt magnesium sulfate as a key binding material, can form two stable crystalline phases under livable conditions; composed of the compounds magnesium oxide, magnesium sulfate and water, generally referred to as the 5-phase (also known as for example 5-1-3 phase, 5Mg(OH)2.MgSO4.3H2O), and 3-phase (also known as 3-1-8 phase, 3Mg(OH)2.MgSO4.8H2O). The former shows a beneficial needle- or whisker-like crystal structure of 0.2-1.0 µm diameter and a length of 20-50 µm that features good bending strength; whereas the latter shows a flaky or irregular crystal shape that results in a weaker composition. Similarly, magnesium (oxy)chloride cement which uses the salt magnesium chloride as a key binding material, is also known to form at least two stable crystalline phases under livable conditions, wherein the magnesium chloride crystalline phases can generally be present in a 5-phase (also 5-1-8 for 5Mg(OH)2.MgCl2.8H2O) phase and/or a 3-phase (also 3-1-8 for 3Mg(OH)2.MgCl2.8H2O). The former shows a beneficial needle- or whisker-like crystal structure of similar dimensions and shape to the magnesium sulfate cement meant 5-phase; whereas the latter shows also irregular crystal shape that results in a weaker composition. Another non-whisker crystal phase exhibiting a "flaky" structure includes magnesium dihydroxide (Mg(OH)2).

In a preferred embodiment of this invention, the at least one whisker crystal phase of the magnesium crystal structure is chosen from the groups of magnesium oxysulfate (MOS) cement, 5Mg(OH)2.MgSO4.3H2O (5-1-3 phase), 5Mg(OH)2.MgSO4.7H2O (5-1-7 phase), Mg(OH)2.2MgSO4.3H2O (1-2-3 phase), Mg(OH)2.MgSO4.5H2O (1-1-5 phase), 2Mg(OH)2.MgCl2.4H2O (2-1-4/2-1-2 phase), 9Mg(OH)2.MgCl2.4H2O (9-1-4-phase). It is found that the combination of the production method, the addition of the additive according to the invention, and the molar ratio of water to magnesium salt to magnesium oxide, further creates a further advantageous whisker 5-phase defined as 5-1-7. Preferably, the whisker crystal phase has an average diameter of 0.2 to 1.0 micrometre and an average length of 1 to 50 micrometres.

Magnesium cement refers to a magnesium composition comprising magnesium oxide, a magnesium salt and water. Said magnesium salt can refer to magnesium oxysulfate or oxychloride. When combined, these compounds form a cementitious matter comprising crystal phases. For the purpose of the current invention, only crystal phases for use in livable conditions are meant, being a ceramic composition comprising a crystal phase structure of magnesium comprising an oxysulfate and/or oxychloride 5-phase and/or 3-phase. The 3-phase "flaky" or irregular structure is generally regarded to be the more stable phase structure under 20-60 degrees Celsius and livable atmospheric conditions. In general, more than 50%, more generally more than 90%, most generally substantially all of the formed crystal structure in oxysulfate or oxychloride cement consists of the 3-phase. Other phases can form for both magnesium salts under extreme pressures and temperatures (up to hundreds of degrees Celsius) but are not stable under livable temperatures. When magnesium cement is prepared, naturally more than 50%, generally more than 90% of the composition consists of irregular, 3-phase crystals. Its flaky or irregular structure results in an efflorescence of the panel surface, and subsequently an inferior cohesion and low surface adhesion which makes it especially unsuitable for use as a component in a flooring panel. It is known in the industry to increase the ratio of 5-phase whisker crystals to up to 20% or even 30% through a costly process called steam curing at temperatures above 100 degrees Celsius and relative humidity of over 80%, but a content of 50% or more of 5-phase whisker crystals; or a ratio of 5-phase whisker crystals vs 3-phase irregular, flaky crystals of more than 1, is unknown.

The invention provides a floor panel comprising at least one core layer comprising a ratio of the magnesium oxysulfate or magnesium oxychloride 5-phase to 3-phase of more than 1. The invention provides a floor or wall panel comprising at least one core layer comprising at least one magnesium cement composition comprising at least 50% by weight of at least one 5-phase crystal structure.

The magnesium oxysulfate whiskers (or 5-phase crystals) benefit of being stable under ambient conditions. The magnesium oxysulfate whiskers may also be referred to as needles. Due to the magnesium oxysulfate whiskers at least partially forming a dense crystal structure, the magnesium oxysulfate whiskers will interlock with one another to form a high density, pore-filling microstructure. These interlocking whiskers thereby provide the improved strength to the core layer of the panel. Additionally, the panel according to the present invention benefits due to the presence of said core layer of a good impact resistance which is beneficial when applying multiple panels in a floor covering according to the invention. The compressive and indentation resistance of the crystal structure of the 5-1-3 oxysulfate and 5-1-8 oxychloride whisker phase is above 50 MPa when tested according to EN 310, whereas the 3-1-8 structure has a compressive and indentation resistance of only about 20 MPa. The panel according to the invention also benefits of a good water and moisture resistance as the whiskers are not easily soluble in water, whereas the 3-phases of both salts are less stable under wet conditions.

The magnesium 5-phase crystals (whiskers) are not an obvious material for a skilled person to use in the core material for the purpose of the present invention and in order to form a crystal structure. Instead of providing further additives to improve the material properties, the invention provides a different material that, combined through novel means, results in a much higher ratio of whisker phase crystals than possible according to the state of the art. It is possible that the core according to the invention comprises at least 50% or up to 100% of magnesium crystals in a 5-phase crystal structure.

In a possible embodiment of the invention, Mg(OH)2.2MgSO4.3H2O (1-2-3 phase) and Mg(OH)2.MgSO4.5H2O (1-1-5 phase), 2-1-4/2-1-2 phase (for 2Mg(OH)2.MgCl2.4H2O), and 9-1-4-phase (for 9Mg(OH)2.MgCl2.4H2O) are also advantageous in applications where a high processing temperature is required, such as when laminating this material in a hot press process, hot extrusion process, hot adhesion process, hot lamination process and the like due to their high heat resistance.

The ratio of whisker-phase cement can be augmented when an additive comprising at least two hydroxyl groups are added therein in quantities of at least 0.1%, preferably at least 0.5%, more preferably at least 1%, such as phosphoric acid, citric acid and derivatives thereof (i.e citrate, phosphates). It was experimentally found that the combination of at least one step of applying pressure of at least 7 Mpa during curing, the molar ratio of water to magnesium salt to magnesium oxide, and the addition of said additive creates a larger ratio of the advantageous heat-resistant crystal phases than previously found possible.

Magnesium oxysulfate and oxychloride whiskers can be produced via mixing of reactive magnesia with an aqueous magnesium sulfate or chloride solution. Said reactive magnesia can be obtained via a calcination process performed at temperatures in the range of 600 to 1300 degrees Celsius, and preferably in the range of 800 to 1000 degrees Celsius. Reactive magnesia (RM) can also be referred to as "caustic-calcined magnesia" (CCM) or light-burned magnesia. Traditional preparation methods known in the art to produce magnesium oxide core boards involve the mixing of an aqueous solution of brine containing a magnesium salt with said reactive magnesium oxide solution to form a mixture in the form of a (liquid) slurry, which is then poured in a mold and allowed to set or cure typically over the course of one to 28 days. The production method allows setting of sedimentation and the creation of air bubbles or pores in the slurry, leading to a density gradient, and a foamed or porous construction in at least part of the core featuring pores or openings where the cement set around the air bubble. The 5-phase whisker crystal growth during the curing process is found to have pore or opening-filling properties. A core comprising a high ratio of 5-phase whisker crystals to 3-phase flake crystals therefore has less pores or openings than a core comprising a higher ratio of flakes to whiskers. Moreover, when whisker crystal growth during the curing process is inhibited by a lack of space, such as by a lack of pores or openings, they even intergrow and form a denser, stronger structure than is normally the case for magnesium oxide cements. When flake crystal growth during the curing process is inhibited by a lack of space, it does not result in a stronger composition. It is therefore an object of the invention to provide a preparation method which solves at least some of the limitations of the existing art A first condition for the formation of the desired magnesium oxide 5-phase whiskers is the ratio of the raw materials. An aqueous magnesium salt solution is prepared by mixing $MgSO_4$ or MgCl2 with water at a ratio of 0.6-2 to 1, stirring it for approximately 2-5 minutes to allow it to dissolve, then added to a dry mixture containing at least reactive magnesia so that the mixture will form a ceramic material during curing. In this way, a magnesium oxide damp composition is obtained. To facilitate a ratio of the whisker crystal phase to flake crystal phase be more than 1, a ratio of MgO vs MgSO4 of around 4.6-5.8 to 1, more ideally 4.9-5.2 should be maintained; of MgO vs MgCl2 of around 7.6-8.8, more ideally of 7.9-8.2 should be maintained. A second condition for the formation of the desired crystal structure is the addition of a (second) aqueous solution comprising 50% to 90% by weight of an compound comprising at least two hydroxyl (—OH) groups to the magnesium oxide damp composition. The fraction of compound to be added is chosen such that it results in a core layer comprising a magnesium oxide composition comprising 0.05% to 10% by weight of at least one compound comprising at least two hydroxyl groups. This includes functional groups that comprise a hydroxyl group such as carboxyls (—COOH) that are noted to have the same effect on the formation of the MOS whisker crystals. Best results were achieved with dicarboxylic acids that contain two carboxyl functional groups —COOH, most favorably with a short chain length, such as oxalic acid C2H2O4 (two carboxyl —COOH groups) or mesoxalic acid C3H2O5 (two to four carboxyl —COOH groups based on presence of water). Good results were also achieved with citric acid C6H8O7 (four —OH hydroxyl groups), and boric acid H3BO3 (three —OH hydroxyl groups). It is found that the addition of at least a fraction of these elements influences the crystal structure of the core layer increases and enhances the crystallization of MgO and also converts the crystallization within MgO into the preferred crystal phase that is advantageous for the foreseen use as a flooring panel. It is also conceivable that phosphoric acid is applied.

In one preferred embodiment, the chemical compound comprising at least two hydroxyl (—OH) groups is an at least one acid having a pH level between 3 to 6 or a pKa level between 3 to 7. Preferably, the chemical compound comprising at least two hydroxyl (—OH) groups is an at least one acid selected from the group comprising of citric acid, boric acid, formic acid (HCOOH), acetic acid (CH3COOH), benzoic acid (C6H5COOH), oxalic acid (C2H2O4), hydrofluoric acid (HF), malic acid (C4H6O5), nitrous acid (HNO2), sulfurous acid (H2SO3), phosphoric acid (H3PO4), or combinations thereof. It is also conceivable that the chemical compound is a derivative of the acids selected from the group comprising of citric acid, boric acid, formic acid (HCOOH), acetic acid (CH3COOH), benzoic acid (C6H5COOH), oxalic acid (C2H2O4), hydrofluoric acid (HF), malic acid (C4H6O5), nitrous acid (HNO2), sulfurous acid (H2SO3), or phosphoric acid (H3PO4). It is preferred that the core layer comprises 0.05% to 5% by weight of at least one compound comprising at least two hydroxyl groups.

In a preferred embodiment, the at least one compound can be an organic compound, inorganic compound, or a combination thereof. The use of this compound, within the preferred ranges of pH level and weight percentage, resulted in an unexpected whisker crystal formation which solely provides the means of having an increased amount of whiskers beneficial to the core layer strength. It is expected that the additive will be incorporated in at least part of the whiskers formed. It is also expected that after the formation of the whisker crystal phase, the compound recombines with other compounds present in the core layer such as magnesium. The recombination can reduce the presence of the compound into approximately zero or in very minimal traces. The presence of the compound can still be proven by the notable and substantial increase in the whisker phases.

In a preferred embodiment, the compound comprising at least two hydroxyl (—OH) groups has a branched. hyper-branched and/or dendritic compound structure. The hydroxyl (—OH) groups can be a nanoscopic compound having a molecular size of 10 to 100 Angstrom. The hydroxyl (—OH) groups can also be a sub-nanoscopic compound comprising a molecular size of 1 to 10 Angstrom. In a preferred embodiment, the compound comprising at least two hydroxyl groups comprises branched additives. The branched additives can have a densely branched polymer backbone and a large number of reactive groups or preferably, primary hydroxyl groups. This creates excellent processing properties at high molecular weights and facilitates customization of core layer properties. It is conceivable that the dendritic structures are formed by geopolymerization of the core material. As a result, advantageous whisker crystal phases are obtained which provides the core layer excellent thermal and chemical resistance as well as improved mechanical properties. The desired dendritic additives may have at least 5 terminal hydroxyl groups, preferably more than 50 terminal hydroxyl groups and a molecular weight between 100 to 10,000 g/mol. It is conceivable that compounds with advantageous structures and at least two terminal hydroxyl groups include polysiloxanes, polysilanes, polysilylenes, polysilazanes, polycarbosilanes, polysilphenylenes, and combinations or derivatives thereof.

This mixture of ceramic material or ceramic cement and additives is poured onto a mold, and allowed to set. A third condition for the formation of the desired crystal structure is the application of a slightly elevated temperature and pressure during at least the initial phase of the setting process. Best results were achieved at 45 to 55 degrees Celsius of temperature and 6-8 Mpa of pressure for at least 1 hour, more advantageously at least 6 hours. It was noted that 50 degrees Celsius of temperature and 7 Mpa of pressure reduced the ratio of flaky crystal phase to well under 50%. The cured material benefits of a good strength and good fire-retardant properties, resulting in the material being in particular suitable for use in the building industry. Since the application of pressure during curing ensures that no pores or openings can be formed in the mixture, the formed 5-phase whisker crystal intergrow and form a denser, stronger structure than is normally the case for magnesium oxide cements.

The synergy of the described parameters of molar ratio of MgO to magnesium salt of 4.9-5.2 to 1; the addition (of 0.05% to 10% by weight of the core) to the damp composition of a second aqueous solution comprising 50% to 90% by weight of an compound comprising at least two hydroxyl (—OH) groups; the application of a slightly elevated temperature and pressure of 45-55 degrees Celsius of temperature and at least 7 Mpa of pressure causes the unexpected result of a ratio of whisker to flaky crystal phase of at least 1:1. In some embodiments, it is possible for the material to substantially only feature whisker phase and substantially no flaky crystal phase. It is theorized that the hydroxyl (—OH) groups of the additive, serve to replace at least part of the H2O molecules present in the magnesium cement matrix, thereby locking the crystals in place and serving as a "seed" around which crystals can be formed. This is only possible at increased temperature which allows the replacement of at least part of the H2O molecules by at least part of the additive's hydroxyl or carboxyl groups. The increased pressure ensures the (inter)growth of 5-phase crystals results in a denser, stronger structure than is known for magnesium oxide cements. The molar ratio of MgO to magnesium salt also prevents the creation of undesired Mg(OH)2, an unstable byproduct of excess reactive magnesia with undesirable material properties, especially at elevated temperatures.

A panel according to the preferred embodiment of the invention comprises mostly a magnesium oxide whisker structure based on magnesium cement, in particular of oxychloride or oxysulfate 5-phase. It is theorized that the 5-1-3 phase oxysulfate whiskers or 5-1-8 oxychloride whiskers present in the panel according to the present invention are transformed into 5-1-2 oxysulfate whiskers or 5-1-7 oxychloride whiskers respectively, of which at least one water molecule is at least partially displaced by at least one of the hydroxyl groups of the additive. Hence, when it is referred to a magnesium crystal 5-phase, the 5-1-3 phase, 5-1-8 phase, 5-1-2 phase and/or 5-1-7 phase can be meant. The panel according to this invention preferably comprises a cement which at least partially consists of a 5-1-2 oxysulfate whisker or 5-1-7 oxychloride phase. The 5-1-2 oxysulfate phase in particular has desirable characteristics, as it contains the smallest amount of H2O molecules of all of the disclosed phases, which has certain advantages in situations where a high moisture content is not desired, such as in hot-pressing of the board, or certain specific uses in the construction industry where a low moisture content is desired. It also offers a panel with a lower specific gravity than panels containing magnesium oxide cements based on phases containing larger amounts of H2O molecules.

A panel according to a preferred embodiment of the invention has a core layer having a thickness in the range of 3 to 10 millimeters. The density of said core layer is typically from 1200-1500 kg/m$^3$, more specifically around 1300-1400 kg/m$^3$. Preferably, the density of the core layer is substantially constant over the entire volume of the core layer. One embodiment of the invention can be composed of multiple layers of magnesium oxysulfate cement or magnesium oxychloride cement, each having a specific crystal structure, with beneficially at least a top layer comprising a ratio of 5-phase whisker to 3-phase flaky structure of more than 1, or a top and bottom layer of a similar ratio, or the substantially entire core consisting of such a similar ratio depending on the specific requirements of the floor panel in question. It is to be understood that in one embodiment, different layers of the core can have different crystal structure ratios for enhanced acoustical performance.

The panel has a substantially planar top side, and a substantially planar bottom side, at least four substantially linear side edges comprising at least one pair of opposite side edges. The panel is typically substantially rectangular or square. However, it is also conceivable that the panel has a substantial parallelogram shape. When it is referred to as a panel, this can both be a floor panel or a wall panel. The term tile is interchangeable with the term panel.

The length-to-diameter ratio of at least a number of magnesium whiskers is typically at least 5, preferably at least 10, more preferably at least 20. In this embodiment the magnesium whiskers can provide sufficient (bending) strength to the core layer of the panel. Possibly, at least a number of magnesium whiskers have an average diameter in the range of 0.2 to 1.0 micrometre and/or at least a number of magnesium whiskers have an average length in the range of 1 to 50 micrometres. Hence, at least a number of magnesium crystals of the whisker-phase and/or 5-phase magnesium crystal structure may have an average diameter in the range of 0.2 to 1.0 micrometers. Further, at least a number of magnesium crystals of the whisker phase and/or 5-phase magnesium crystal structure may have an average length in the range of 1 to 50 micrometers. The exact shape of the magnesium whiskers may differentiate, due to the phase wherein the magnesium whiskers are stable at the given temperature and humidity.

It is not required that the magnesium whiskers in the core layer form a crystal structure over the substantially entire core layer. In fact, in a preferred embodiment the core layer comprises at least 50% by weight of magnesium 5-phase crystals, preferably at least 55% by weight and more preferably at least 60% by weight of the whisker-phase crystal structure. The magnesium oxide composition possibly comprises a magnesium crystal structure which comprises at least 55% by weight of at least one 5-phase magnesium crystal structure. In a further preferred embodiment, the magnesium oxide composition comprises a magnesium crystal structure which comprises at least 60% by weight of at least one 5-phase magnesium crystal structure or more preferably at least 70% by weight of at least one 5-phase magnesium crystal structure. The further volume of the core layer may have a non-crystal structure. The further volume of the core layer may for example be at least partially porous. It is also conceivable that the entire magnesium crystal structure of the magnesium oxide composition is a 5-phase magnesium crystal structure.

At least one core layer of the panel could possibly comprise at least one a reinforcing layer. In a possible embodiment the core layer comprises an upper part and a lower part and a reinforcing layer situated between said upper part and said lower part of the core layer. The upper part of the core layer may even define the substantially planar top side, and the bottom part of the core layer may define the substantially planar bottom side of the panel. The presence of at least one reinforcing layer may lead to improvement of the acoustic properties of the panel. This may for example result in improved sound dampening properties. The presence of at least one reinforcing layer may also contribute to an improved strength of the panel as such. The reinforcement layer may for example comprise a woven or non-woven fiber material. The reinforcing layer may in a beneficial embodiment comprise fiberglass. The reinforcing layer may in particular comprise a fiberglass mesh. A non-limiting example thereof is a fiberglass mesh having a mesh size of at least 5×5 mm, and/or the fiberglass mesh having an area weight of at least 90 g/m2. In a possible embodiment, the fiberglass mesh may be provided with a coating, in order to prevent skin-reactions during physical contact. It is conceivable that the reinforcing layer has a thickness of about 0.2 to 0.4 millimeters.

It is also conceivable that at least one core layer further comprises two reinforcing layers and an intermediate layer sandwiched between said two reinforcing layers. In yet a further possible embodiment, the core layer further comprises an intermediate part and a further reinforcing layer, wherein a first reinforcing layer is situated between said upper part and said intermediate part of the core layer, and a second reinforcing layer is situated between said intermediate part and said lower part of the core layer. The first and second reinforcing layers can both consist of a reinforcing layer as described above. The intermediate part of the core layer does not necessarily have the same material properties as the further parts of the core layer. It is for example conceivable that the intermediate part of the core layer is at least partially foamed. The intermediate part may therefore comprise a foaming agent. Such, at least partially foamed intermediate part of the core layer may further improve the acoustic performance of the panel.

It is conceivable that at least one core layer further comprises at least one filler material, selected from the group comprising of a mineral material, glass material, a polymer material and/or a natural material. Glass materials can also be used as a filler such as those in the form of glass microspheres. It is also conceivable polymer materials can also be used in the core layer wherein both the polymer and glass materials as fillers reduce the overall weight of the floor panel. It is conceivable that natural materials are used as filler to reduce the overall weight while not compromising on degradability, such as cork granules, wood fibers, straw, rice husk, and the like. Other conceivable fillers are talc, calcium carbonate ($CaCO_3$), perlite, polymer foam beads and/or a combination thereof. The core layer may for example comprise up to 15 wt % and preferably up to 10 wt % of fillers. The core layer and/or the magnesium oxide cement may also comprise at least one further additive. At least one additive can for example be chosen from the group consisting of: a pigment, a colorant, an impact modifier, a lubricant, a stabilizer, a wax, an anti-halogen agent and/or an aid processing agent. The core layer may for example comprise up to 5 wt % of additive(s), preferably up to 2 wt %. A non-limiting example is the core layer comprising up to 1 wt %, preferably up to 0.5 wt % and more preferably up to 0.25 wt % ferric oxide ($FeO_3$). It is also conceivable that the core layer further comprises at least one compound selected from the group comprising of: calcium chloride ($CaCb$), calcium hydroxide $CA(OH)2$, sodium hydroxide (NaOH), aluminium sulphate ($AL2(SO4)3$) and/or sodium carboxymethyl cellulose, which may aid in the oxidization/decomposition of the core layer's composition into easily available forms thereby improving the workability thereof. As a result, the biodegrability of the panel is also improved. In yet another embodiment, the core layer may also comprise of silica fume which acts to enhance water resistivity and non-flammability of the panel. It is also conceivable to impart pigment in the magnesium oxide.

The panel preferably comprises at least one pair of opposite side edges which are provided with interconnecting coupling means. In a preferred embodiment, the panel comprises two pairs of opposite side edges which are provided with interconnecting coupling means. This will contribute to the ease of connect of multiple panels when assembling for example a floor or a wallcovering. The interconnecting coupling means typically comprise a tongue and a groove wherein the tongue is provided on one side edge (opposite) of one pair of opposite side edges, and the groove is provided on the other side edge of the same pair of opposite side edges. The interconnecting coupling means of co-acting panels may be provided with co-acting locking elements. In yet another further embodiment of the present invention, the tongue and/or the groove are made of a magnesium oxide composition comprising a magnesium crystal structure which comprises at least 50% by weight of at least one 5-phase magnesium crystal structure. It is in particular conceivable that an upper lip and a lower lip of the groove are made of a magnesium oxide composition comprising a magnesium crystal structure which comprises at least 50% by weight of at least one 5-phase magnesium crystal structure. Possibly, both the tongue and the groove comprise at least one magnesium crystal structure present in a whisker form and a flake form, wherein a ratio between the whisker form and the flake form is no less than 1.

In a possible embodiment of the panel according to the invention the core layer further comprises at least one polymer and/or wood based material. It is also conceivable that the core layer further comprises at least one binder.

It is also possible that the panel further comprises at least one top layer. The top layer is typically provided on the top surface of the panel. It is beneficial if the top layer has suitable properties for its intended use such as a waterproof layer, wear layer, and/or decorative layer. Said top layer can be directly or indirectly attached to the core layer of the panel, for example via an adhesive, a hot melt material and/or hot or cold pressing. A decorative top layer, if applied, may for example comprise at least one ply of cellulose-based layer and a cured resin, wherein the cellulose-based layer is preferably paper or kraft paper. Said ply of cellulose-based material may also be a veneer layer adhered to a top surface of the core layer. The veneer layer is preferably selected from the group consisting of wood veneer, cork veneer, bamboo veneer, and the like. Other decorative top layers that could possibly be applied for the present invention include a ceramic tile, a porcelain tile, a real stone veneer, a rubber veneer, a decorative plastic or vinyl, linoleum, and decorative thermoplastic film or foil. The top layer may possibly be further provided with a wear layer and optionally a coating. Examples of thermoplastics that could be used in such top layer are PP, PET, PVC and the like. It is also possible to provide on the top facing surface of the core an optional primer and print the desired visual effect in a direct printing process. The decorative top layer can receive a further finishing with a thermosetting varnish or lacquer such as polyurethane, PUR, or a melamine based resin.

In a further possible embodiment comprises the panel at least one backing layer. This can be any suitable backing layer for use with (floor) panels. It is also conceivable that the panel comprises (at its back surface) at least one balancing layer, generally composed of at least one layer of lignocellulose and a cured resin. The panel may also comprise at least one acoustic layer, usually composed of a low density foamed layer of ethylene-vinyl acetate (EVA), irradiation-crosslinked polyethylene (IXPE), expanded polypropylene (XPP), expanded polystyrene (XPS), but also nonwoven fibers such as made from natural fibers like hemp or cork, or recycled/recyclable material such as PET. The density of this acoustic layer preferably has a density between 65 kg/m$^3$ and 300 kg/m$^3$, most preferably between 80 kg/m$^3$ and 150 kg/m$^3$.

The invention also relates to a floor covering comprising multiple panels, in particular floor panels, according to any the preceding claims. However, a wall covering comprising multiple panels according to the invention also falls within the scope of the present invention.

The invention further relates to a method for producing a panel, in particular a floor or wall panel, preferably according to any embodiment of the present invention, the method comprising the steps of:
 a) preparing a magnesium oxide composition comprising magnesium oxide and at least one magnesium salt;
 b) adding at least one slurry comprising at least one compound comprising at least two hydroxyl groups to the magnesium oxide composition; and
 c) applying a force of at least 7 MPa at a temperature in the range of 45 to 55 degrees Celsius for a predetermined period of time to form a core layer.

Preparing of the magnesium oxide damp composition comprising magnesium oxide and at least one magnesium salt can be done by mixing of a brine comprising at least one magnesium salt into said a composition comprising at least one magnesium oxide such that a magnesium oxide damp composition is formed. The predetermined period of time is preferably at least one hour. The method results in obtaining a core layer comprising a magnesium crystal structure comprising 0.05% to 5% by weight of at least one compound.

The invention thus also relates to a method for producing a panel, in particular a floor or wall panel, preferably according to any embodiment of the present invention, the method comprising the steps of:
 a1) providing a composition comprising at least one magnesium oxide;
 b1) providing a brine comprising at least one magnesium salt and water;
 c1) mixing of said brine into said composition of magnesium oxide such that a magnesium oxide damp composition is formed;
 d1) preferably adding at least one aqueous slurry comprising at least one compound comprising at least two hydroxyl groups to the magnesium oxide composition;
 e1) subjecting the magnesium oxide damp composition to at least one screening step
 f1) applying at least one layer of the magnesium oxide composition upon a mold; and
 g1) subjecting the layer of magnesium oxide damp composition to a force having a pressure of at least 7 MPa at a temperature at least in the range of 45 to 55 degrees Celsius for at least 1 hour such that a core layer comprising an upper core surface and a lower core surface is obtained.

The magnesium oxide damp composition can also be referred to as magnesium oxide cement damp composition. The screening step can also be a seiving step. The magnesium oxide dry composition can for example be a magnesium oxide powder. The method results in obtaining a core layer comprising a magnesium crystal structure comprising 0.05% to 5% by weight of at least one compound.

The aqueous slurry, applied in step b) (or d1)) could for example comprise up to 90% of at least one compound comprising at least two hydroxyl groups. Said compound comprising at least two hydroxyl (—OH) groups is typically an acid such as oxalic acid, citric acid, phosphoric acid and/or boric acid with a pH level between 3 to 6 or a pKa level between 3 to 7. A fraction of said aqueous slurry is added during step b) (or d1)).

The steps of said method are generally subsequent steps. After the pressure of step c) (or g1)) is released, a core layer, or core board whereof multiple core layers can be formed, is obtained. The method according to the preferred embodiment of the present invention allows to produce a core layer having a density in the range of 1200 kg/m$^3$ to 1600 kg/m$^3$, in particular between 1350 kg/m$^3$ and 1550 kg/m$^3$. The method also enables that a core layer can be obtained having a density which is substantially constant over the entire volume of the core layer. This can at least partially be explained by the pressure applied at step c) (or g1)). A substantially constant density is also beneficial for the overall strength of the panel. Typically, the magnesium oxide damp composition, e.g. magnesium oxysulfate cement and magnesium chloride cement, is formed by mixing at least one magnesium oxide powder and brine. The magnesium oxide damp composition is in practice a substantially powdery composition, which has a lower water content than a convention magnesium oxide slurry. The magnesium oxide damp composition is typically slightly wet but not soaked. Hence, the magnesium oxide damp composition can also be classified as textured composition. Preferably, the magnesium oxide damp composition is mixed prior to at least one screening step. During at least one screening step, a mesh size between 10 and 35 mm could for example be applied. The screening step can, for example, be achieved by making use of a processor which preferably comprises brushes and/or screens, for example screens having a mesh size between 10 and 35 mm. It is also possible that multiple subsequent screening steps are applied to ensure that the screened magnesium oxide cement damp composition is even.

The layer of magnesium oxide damp composition is preferably subjected to a temperature at least in the range of 45 to 55 degrees Celsius. It is beneficial that such relatively low temperature can be applied for multiple reasons, for example for efficiency, energy and safety reason. The temperature is preferably substantially lower than 100 degrees Celsius and/or higher than 40 degrees Celsius. It is also conceivable that the magnesium oxide damp composition (during step c) or g1)) is subjected to a temperature in the range of 40 to 60 degrees Celsius, in the range of 50 to 90 degrees Celsius or in the range of 50 to 75 degrees Celsius.

The method according to the present invention allows to achieve panels having a rather consistent density, which can be at least partially explained by the combination of steps a) and c) (or e1) and g1)). These steps also at least partially prevent bubble formation and/or remove gas and/or bubbles present in the damp composition. Step c) (or g1)) enables the (chemical) reaction of the components of the magnesium oxide damp composition to finish and/or to cure the magnesium oxide damp composition. A further benefit of the method according to the present invention is that where conventional magnesium oxide cement based panels are typically produced by a process using excessive water, the panel according to the preferred embodiment of the present invention can produce via a more water efficient method. In practice, this means that substantially less watering process is used, and needed, during the production process and it also enables a significant reduction of the overall production time. Hence, no overload of water is applied during the production process, which is amongst others, beneficial from environmental point of view. Typically, a predetermined amount of water is applied for forming the magnesium oxide damp composition, wherein the amount is determined based upon the water required for the (chemical) reaction with magnesium oxide and optionally any further components and/or curing thereof. For example, the amount of water to be used can be controlled based upon the desired properties of the final product and the desired crystal structure in the core layer. More specifically, the amount of water in weight percentage or molar ratio added to the composition directly influences which crystal structure is formed in the core layer during the pressing phase.

Step c) (or g1))) of the method can, for example, be achieved via at least one pressing and/or compressing step. Step c) (or g1)) enables the removal of excessive liquid from the magnesium oxide cement damp composition. During step c) (or g1)), the magnesium oxide damp composition is typically dried and/or cured. The at least one screening step enables that a more even magnesium oxide damp composition can be obtained.

Where it is referred to a mold, a conveyer, container and/or a plate can also be meant. Basically, due to the magnesium oxide damp composition having a relatively functional structure, it is not required that the mold comprises raised edges and/or a rim. Typically, the magnesium oxide damp composition has a relatively low moisture content, wherefore the damp composition does not behave like a liquid. This enables easier handling of the composition during processing thereof. The method may for example involve applying a layer which is at least partially 4 to 7 cm in thickness of the magnesium oxide cement damp composition in or upon the mold. As indicated above, the method can also allow the production of core board whereof multiple core layers are formed.

As indicated above, a core layer comprising magnesium oxide cement and natural fibers, may have a density in the range of 1350 kg/m$^3$ to 1550 kg/m$^3$, resulting in a core layer having a relatively good flexural and structural strength.

Preferably, the magnesium oxide damp composition formed at step a) (or c1)) has a moisture content below 25 wt %, preferably below 10 wt %, more preferably at about 7% (7 wt %+/−2 wt %). It is for example possible that the magnesium oxide damp composition formed at step a) (or c1) has a moisture content between 10 wt % (+/−2 wt %) and 7 wt % (+/−2 wt %). It is possible to apply such relatively low moisture content due to the combination and/or fractions of materials used and the process steps applied in the present method. As indicated above, in the prior art it is known to produce magnesium oxide cement based panels via an extensive and time consuming process of drying of a magnesium oxide cement slurry, wherein the slurry contains at least 50 wt % of water, and often even over 60 wt % water. The need to use an overload of water is overcome by the method according to the present invention. The magnesium oxide damp composition may further comprise magnesium hydroxide, magnesium chloride and/or magnesium oxysulfate. The magnesium oxide damp composition may further comprise any of the additives and/or fillers as described for the present invention.

It is conceivable that natural fibers are added to the magnesium oxide damp composition after or during step a) (or c1)). The magnesium oxides damp composition may for example comprises at least 30 wt % natural fibers. The natural fibers may comprise at least one element chosen from the group of: wood fibers, bamboo fibers, animal fibers, and/or mycelium fibers. The natural fibers may be any of the above described natural fibers and may be present in any of the above described volumes. The average length of the natural fibers may for example be at least 2 mm. The natural fibers may comprise lignocellulose fibers, such as but not limited to wood fibers. Mixing of the magnesium oxide damp composition may contribute to at least part of the natural fibers being encapsulated by magnesium oxide cement. It is experimentally found that magnesium oxide and natural fibers effectively bond under pressure.

The method is typically performed under ambient conditions. However, it is also conceivable that the method is performed under vacuum or under a predetermined pressure above atmospheric pressure. Step c) (or g1)) is typically performed for a duration of at least 2 hours, preferably at least 4 hours. Step c) (or g1)) is in a further preferred embodiment performed for a duration between 6 hours to 12 hours. Afterwards, the panels can be demolded and/or cured. The method may comprise the step of demolding of the obtained core layer.

The boards or panels typically have an initial strength that is at least 50% of the final strength after said duration intervals, and are the sufficiently strong to be further processed. Hence, the required process time is significantly shorter than the process time which are typically required for the production of a magnesium oxide based panel. Conventional processes for the production of a magnesium oxide based panel typically have a duration of at least seven days, which can be even longer in case a layer of fiberglass is included in the panel.

The method may optionally comprise the step of attaching at least one decorative top layer to an upper core surface of the core layer, preferably by applying heat and/or pressure. This step is made possible due to the technical possibility of avoiding the creation of a density gradient in the panel, in particular in the core layer of the panel, which is a result of the pressure applied at step c) (or g1)) and the consistency of the damp composition. It is also conceivable that a density gradient is present in the panel. It is possible to provide a core with a consistent density gradient, or a lack of density gradient, that being a core with an even specific gravity across the volume of the core.

The current method enables the production of a panel having a core layer with a density that is substantially constant over the entire volume of the core layer thereby increasing the overall strength thereof which allows the panel to withstand further application of heat and pressure without being damaged. With the core layer being free of any regions and/or zones having an increased density, which is typical of conventional magnesium oxide cement based panels, hot pressing of at least one layer of impregnated paper, or lignocellulose impregnated with a resin, to the upper and lower surfaces of the panel is made possible without causing the panel to warp or bend despite the core layer comprising magnesium oxide cement. Hot pressing of at least one layer of impregnated paper to the upper and lower surfaces of the panel is typically done by applying heat and pressure to the panel, more specifically to the core layer thereof. Optionally, the core layer can be subjected to a sanding process to increase adhesion prior to hot pressing. Preferably, the core layer is subjected to a temperature ranging from 100° C.-200° C., more preferably 170° C.-200° C., most preferably 175° C.-190° C. and to pressure ranging from 5-25Mpa, more preferably 18-22Mpa, most preferably around 20Mpa. The application of heat and pressure to the core layer is conceived to last for at least 10 seconds to about 45 minutes, more preferably at least 30 seconds to about 90 seconds, most preferably at least 50 seconds to about 80 secs.

The method may also comprise the step of profiling and/or edging of at least one side edge of at least one panel, and in particular the core layer of the panel. Such step may for example involve that at least one pair of complementary coupling parts is provided at least two opposite side edges of the panel, preferably wherein the complementary coupling parts are configured such that in a coupled state a pretension is existing. In a preferred embodiment, the complementary coupling parts specifically contain a higher ratio of 5-phase whisker phase to 3-phase flake phase, allowing for a pretension to exist in the coupled state of the coupling parts due to the enhanced strength the 5-phase content provides to the coupling parts. It is possible and desirable therefore that the coupling parts contain a 5-phase to 3-phase magnesium cement of more than 1, where the rest of the core may have a different ratio.

The method may for comprise a step of attaching at least one decorative top layer to the upper core surface of the core layer and/or attaching at least one balancing layer to the lower core surface of the core layer. Non-limiting examples of possible balancing layers and/or decorative top layers to be used are described above for the panel according to the present invention.

In a further possible embodiment, the layer of magnesium oxide damp composition is during step c) (or g1)) subjected to a force having a pressure between 7 MPa and 20 MPa. It is, for example, also possible that the magnesium oxide damp composition is subjected to a force having a pressure below 18 MPa. The preferred pressure applied is at least partially dependent of the desired thickness and/or density of the final product.

The invention will be elucidated on the basis of the following non-limitative clauses.

1. Panel, in particular a floor panel, suitable for forming a floor covering, wherein the panel has a substantially planar top side, and a substantially planar bottom side, at least four substantially linear side edges comprising at least one pair of opposite side edges, the panel comprising:
at least one core layer at least partially comprising a magnesium crystal structure, wherein said at least one core layer comprises 0.05% to 5% by weight of at least one compound comprising at least two hydroxyl groups.

2. Panel according to clause 1, wherein the magnesium crystal structure is a magnesium oxysulfate and/or magnesium oxychloride crystal structure.

3. Panel according to any of the preceding clauses, wherein at least part of said magnesium crystal are present in a long interlocking crystal structure or "whiskers" and some in a short irregular crystal structure or "flakes".

4. Panel according to any of the preceding clauses, wherein the ratio of the whisker phase to the flake crystal phase is higher than 1

5. Panel according to any of the preceding clauses, wherein the length-to-diameter ratio of at least a number of magnesium crystals is at least 5, preferably at least 10, more preferably at least 20.

6. Panel according to any of the preceding clauses, wherein at least a number of magnesium oxysulfate crystals, and in particular magnesium oxysulfate whiskers, have an average diameter in the range of 0.2 to 1.0 micrometre.

7. Panel according to any of the preceding clauses, wherein at least a number of magnesium oxysulfate crystals, and in particular magnesium oxysulfate whiskers, have an average length in the range of 1 to 50 micrometres.

8. Panel according to any of the preceding clauses, wherein the core layer comprises at least 5% by weight of magnesium oxysulfate whiskers, preferably at least 10% by weight and more preferably at least 20% by weight of the whisker-phase crystal structure.

9. Panel according to any of the preceding clauses, wherein said compound comprising at least two hydroxyl (—OH) groups is an acid such as oxalic acid, citric acid, phosphoric acid and/or boric acid.

10. Panel according to any of the preceding clauses, wherein the core layer comprises an upper part and a lower part and a reinforcing layer situated between said upper part and said lower part of the core layer.

11. Panel according to clause 10, wherein the reinforcing layer comprises fiberglass.

12. Panel according to any of clauses 10-11, wherein the upper reinforcing layer comprises a fiberglass mesh.

13. Panel according to any of clauses 10-12, wherein the core layer comprises an intermediate part and a further reinforcing layer, wherein a first reinforcing layer is situated between said upper part and said intermediate part of the core layer, and a second reinforcing layer is situated between said intermediate part and said lower part of the core layer.

14. Panel according to any of the preceding clauses, comprising two pairs of opposite side edges which are provided with interconnecting coupling means.

15. Panel according to any of the preceding clauses, wherein the interconnecting coupling means comprise a tongue and a groove wherein the tongue is provided on one side edge of one pair of opposite side edges, and the groove is provided on the other side edge of the same pair of opposite side edges.

16. Panel according to any of the preceding clauses, wherein the core layer further comprises at least one binder.

17. Panel according to any of the preceding clauses, comprising at least one top layer, the top layer comprises at least one decorative layer and/or protective layer.

18. Panel according to any of the preceding clauses, comprising at least one optional backing layer for improved balance and/or acoustical performance 19. Floor covering comprising multiple panels, in particular floor panels, according to any the preceding clauses.

FIG. 1 shows a schematic representation of a cross section of a first embodiment of a panel (101) according to the invention. The figure shows the panel (101) comprising a core layer (102) comprises a magnesium oxide composition comprising at least magnesium oxide and magnesium salt, wherein said magnesium oxide composition comprises a magnesium crystal structure (104). The magnesium crystal structure (104) preferably comprises at least 50% by weight of at least one whisker-phase magnesium crystal structure. The whisker-phase magnesium crystal structure comprises magnesium crystal whiskers (103). It can be seen that the magnesium crystal whiskers (103) interlock with another. The panel (101) as shown, further comprises a top layer (105) and optionally a backing layer (106), which are both optional.

Figure 2:
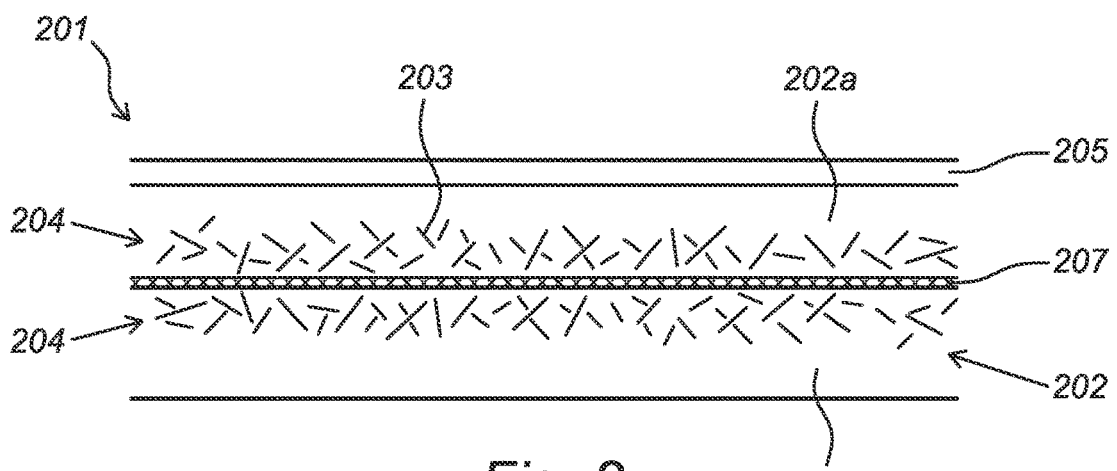

FIG. 2 shows a schematic representation of a cross section of a second possible embodiment of a panel (201) according to the invention. The figure shows the panel comprising a core layer (202) comprising an upper part (202a) and a lower part (202b) and a reinforcing layer (207) situated between said upper part (202a) and said lower part (202b) of the core layer (202). Both parts (202a, 202b) of the core layer (102) comprise magnesium crystal whiskers (203) which at least partially form a 5-phase crystal structure (204). Despite the figure showing only a part of the total volume of the core layer (202) comprises a crystal structure (204), typically between 50 and 100% by weight of the magnesium oxide composition of the core layer is present in a 5-phase magnesium crystal structure. The reinforcing layer (207) comprises a fiberglass mesh. The panel (201) further comprises a top layer (205).

Figure 3:
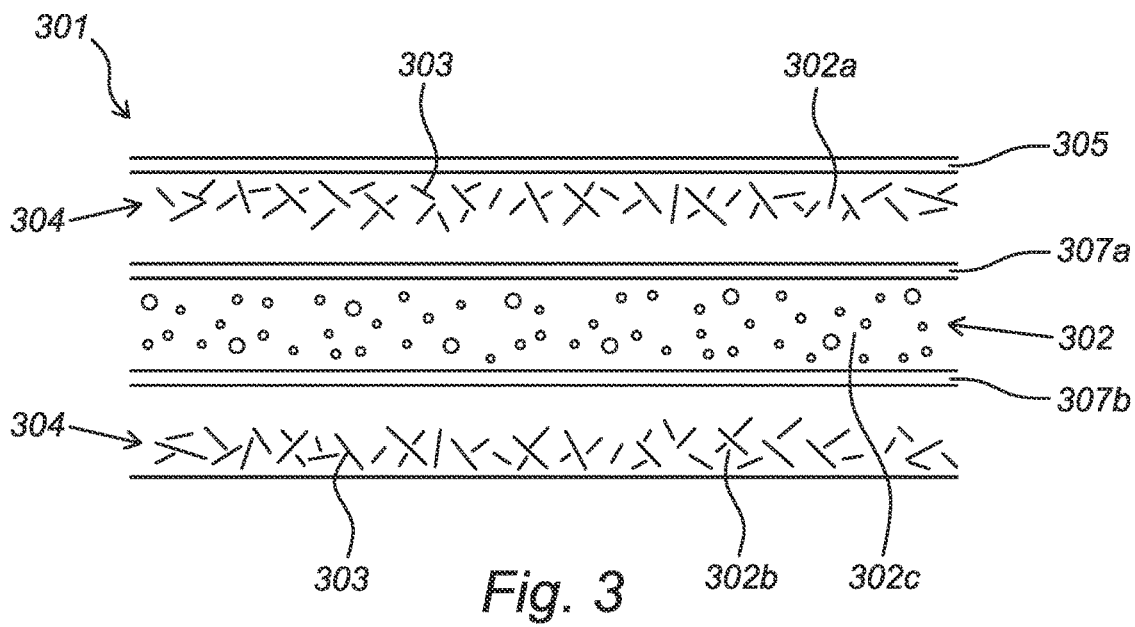
Figure 4:
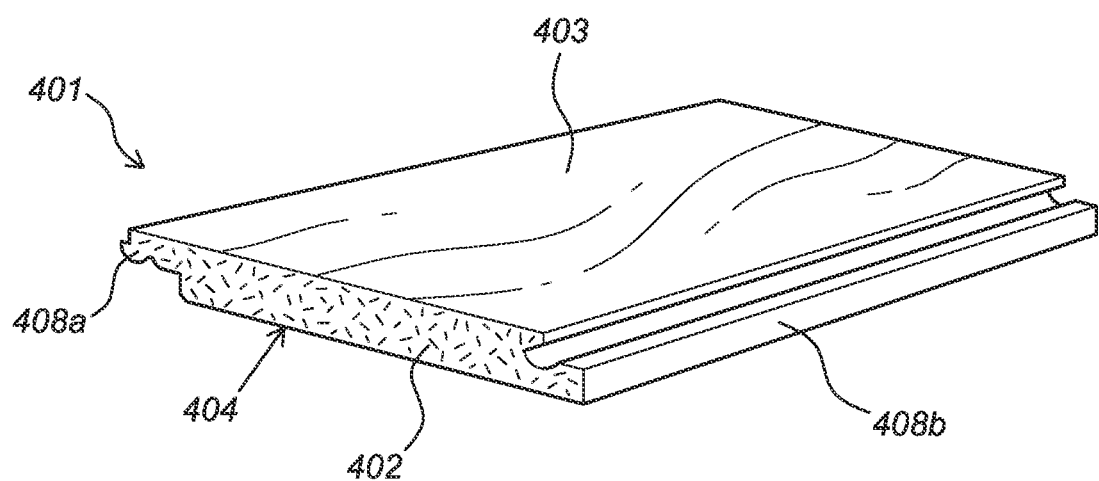
FIG. 4 shows a perspective view of the panel according to the present invention.
Figure 5:
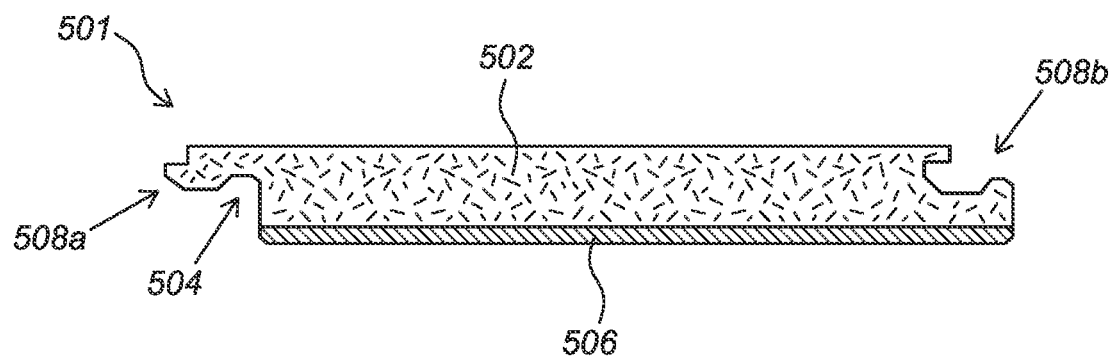
FIG. 5 shows a cross section of a further possible embodiment of a panel according to the present invention.

FIG. 3 shows a schematic representation of a cross section of a third possible embodiment of a panel (301) according to the invention. The figure shows the panel comprising a core layer (302) wherein the core layer (302) comprises respectively an upper part (302a), a lower part (302b) and an intermediate part (302c). Said parts are separated via multiple reinforcing layers (307a, 307b). In the present embodiment, there is this intermediate part (302c) of the core layer (302), which is a foam layer. The other parts (302a, 302b) of the core layer (102) comprise magnesium crystal whiskers (303) which at least partially form a crystal structure (304). The panel (301) further comprises a top layer (305). The panels as shown in FIGS. 1-3 could optionally be provided with interconnecting coupling parts (for example as shown in FIGS. 4 and 5) for interconnecting adjacent panels, FIG. 4 shows a perspective view of a possible embodiment of a flooring panel (401) according to the present invention. The panel (401) comprises a core layer (402) and a decorative top layer (403). The core layer (102) comprises two pairs of opposite side edges. In the shown embodiment, a first pair of opposite side edges is provided with interconnecting coupling parts (408a, 408b) for interconnecting adjacent panels (401). The shown interconnecting coupling parts (408a, 408b) are shown as an illustration, any type of conventional coupling parts could be applied. The core layer (402) comprises a magnesium crystal structure (404) comprising magnesium crystal whiskers (403).

FIG. 5 shows a cross section of a further possible embodiment of a flooring panel (501) according to the present invention. The panel (501) comprises a core layer (501) and backing layer (506). The panel (501) further comprises interconnecting coupling parts (508a, 508b) for interconnecting adjacent panels (501).

Figure 6:
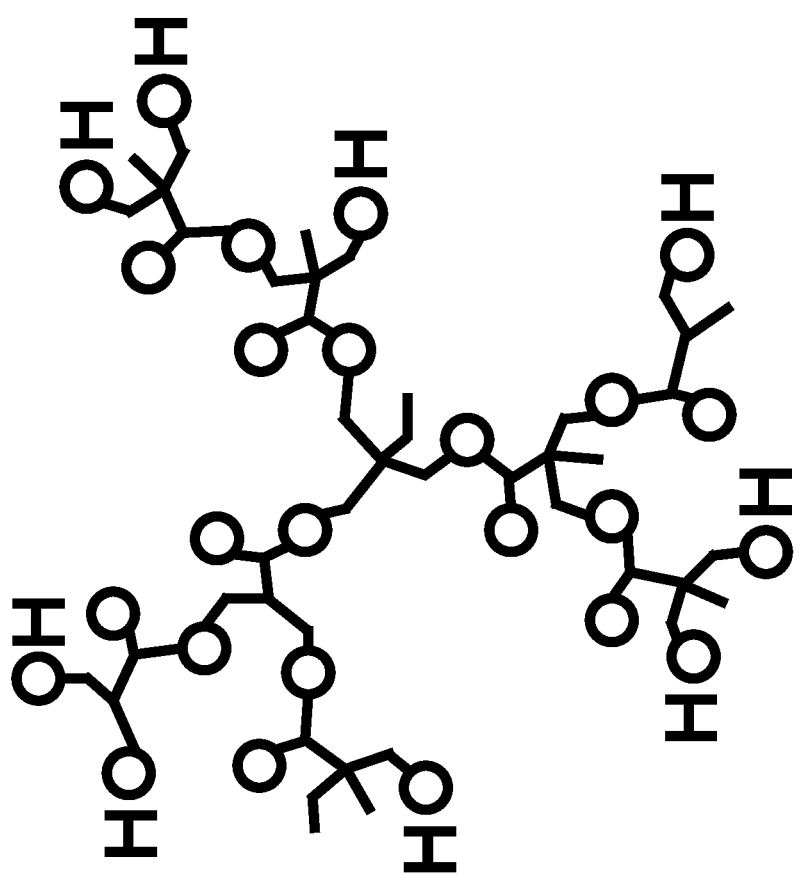
FIG. 6 shows a branched structure of the compound or additive according to the present invention.

FIG. 6 shows a schematic representation of a possible branched compound structure in accordance with the embodiments of this invention. The branched structure shows the presence of at least two hydroxyl groups which are added as a compound or additive in the core layer.

It will be apparent that the invention is not limited to the working examples shown and described herein, but that numerous variants are possible within the scope of the attached claims that will be obvious to a person skilled in the art.

The verb "comprise" and conjugations thereof used in this patent publication are understood to mean not only "comprise", but are also understood to mean the phrases "contain", "substantially consist of", "formed by" and conjugations thereof.

What is claimed is:

1. A panel suitable for forming a floor or wall covering, comprising at least one core layer having a planar top side, and a planar bottom side, at least four linear side edges,
    wherein the at least one core layer comprises a magnesium oxide composition comprising at least a magnesium oxide and a magnesium salt,
    wherein said magnesium oxide composition comprises a magnesium crystal structure, and
    wherein the magnesium crystal structure comprises at least 50% by weight of at least one whisker-phase magnesium crystal structure.

2. The panel according to claim 1, wherein the magnesium salt is magnesium sulfate, magnesium chloride, or combination thereof.

3. The panel according to claim 1, wherein the magnesium crystal structure comprises at least a number of magnesium crystals having an average diameter in a range of 0.2 to 1.0 micrometers.

4. The panel according to claim 1, wherein the magnesium crystal structure comprises at least a number of magnesium crystals having an average length in the range of 1 to 50 micrometers.

5. The panel according to claim 1, wherein the magnesium crystal structure comprises at least 70% by weight of at least one whisker-phase magnesium crystal structure.

6. The panel according to claim 1, wherein at least part of the at least one whisker-phase magnesium crystal structure is a 5-phase magnesium crystal structure.

7. The panel according to claim 6, wherein the 5-phase magnesium crystal structure is chosen from a group consisting of 5-1-2, 5-1-3, 5-1-7, 5-1-8 crystal phases.

8. The panel according to claim 1, wherein the magnesium crystal structure of the magnesium oxide composition further comprises at least 5% of a heat-resistant crystal structure chosen from a group consisting of 2-1-4, 2-1-2, 1-2-3, 1-1-5, 9-1-4 crystal phases.

9. The panel according to claim 1, wherein the magnesium oxide composition comprises 0.05% to 10% by weight of at least one compound comprising at least two hydroxyl groups.

10. The panel according to claim 9, wherein said at least one compound comprising at least two hydroxyl groups is selected from a group comprising of oxalic acid, citric acid, phosphoric acid or boric acid.

11. The panel according to claim 9, wherein said at least one compound comprising at least two hydroxyl groups comprises at least one acid having a pH level between 3 to 6 or a pKa level between 3 to 7.

12. The panel according to claim 9, wherein said at least one compound comprising at least two hydroxyl groups is a nanoscopic compound having a molecular size of 10 to 100 Angstrom.

13. The panel according to claim 9, wherein said at least one compound comprising at least two hydroxyl groups is a sub nanoscopic compound comprising a molecular size of 1 to 10 Angstrom.

14. The panel according to claim 9, wherein said at least one compound comprising at least two hydroxyl groups has a branched, a hyperbranched or a dendritic structure.

15. The panel according to claim 9, wherein said at least one compound comprising at least two hydroxyl groups comprises more than 5 hydroxyl groups.

16. The panel according to claim 9, wherein said at least one compound comprising at least two hydroxyl groups has a branched, a hyperbranched and a dendritic structure.

17. The panel according to claim 1, wherein the core layer comprises at least one pair of opposite side edges, wherein said at least one pair of opposite side edges are provided with interconnecting coupling means.

18. The panel according to claim 17, wherein the interconnecting coupling means comprises a tongue and a groove, wherein the tongue is provided on a first side edge of a pair of opposite side edges, and the groove is provided on a second side edge of the pair of opposite side edges.

19. A floor or wall covering comprising multiple panels according to claim 1.

* * * * *